US012089187B2

(12) United States Patent
Sarkis et al.

(10) Patent No.: US 12,089,187 B2
(45) Date of Patent: Sep. 10, 2024

(54) SIDELINK COMMUNICATIONS FOR DIFFERENTLY-CONFIGURED USER EQUIPMENT

(71) Applicant: QUALCOMM Incorporated, San Diego, CA (US)

(72) Inventors: Gabi Sarkis, San Diego, CA (US); Seyedkianoush Hosseini, San Diego, CA (US); Hong Cheng, Basking Ridge, NJ (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 346 days.

(21) Appl. No.: 17/457,780

(22) Filed: Dec. 6, 2021

(65) Prior Publication Data

US 2022/0191829 A1 Jun. 16, 2022

Related U.S. Application Data

(60) Provisional application No. 63/123,870, filed on Dec. 10, 2020.

(51) Int. Cl.
*H04W 56/00* (2009.01)
*H04W 4/40* (2018.01)
*H04W 72/02* (2009.01)
*H04W 72/0446* (2023.01)
*H04W 76/28* (2018.01)

(52) U.S. Cl.
CPC ............. *H04W 72/02* (2013.01); *H04W 4/40* (2018.02); *H04W 72/0446* (2013.01); *H04W 76/28* (2018.02)

(58) Field of Classification Search
CPC ....... H04W 72/02; H04W 76/28; H04W 4/40; H04W 72/0446
USPC ........................................................ 370/329
See application file for complete search history.

(56) References Cited

U.S. PATENT DOCUMENTS

2023/0397295 A1\* 12/2023 Salim ................... H04W 76/28

OTHER PUBLICATIONS

"Wu, Resource Allocation Method And Device, May 11, 2021, CN 112788670" (Year: 2019).\*
Huawei., et al., "Physical Layer Impacts of Sidelink DRX", 3GPP Draft, R1-2008332, 3GPP TSG RAN WG1 #103-e, 3rd Generation Partnership Project (3GPP), Mobile Competence Centre, 650, Route Des Lucioles, F-06921 Sophia-Antipolis Cedex, France, vol. RAN WG1, No. E-meeting, Oct. 26, 2020-Nov. 13, 2020, Oct. 24, 2020 (Oct. 24, 2020), XP051946632, 6 Pages, Retrieved from the Internet: URL:https://ftp.3gpp.org/tsg_ran/WG1_RL1/TSGR1_103-e/Docs/R1-2008332.zip R1-2008332.docx [retrieved on Oct. 24, 2020] 3, Section 3.1.
International Search Report and Written Opinion—PCT/US2021/072787—ISA/EPO—Mar. 23, 2022.

\* cited by examiner

*Primary Examiner* — Sai Ming Chan
(74) *Attorney, Agent, or Firm* — Harrity & Harrity, LLP

(57) ABSTRACT

Various aspects of the present disclosure generally relate to wireless communication. In some aspects, a first user equipment (UE) may identify a set of resources for communication with a second UE, wherein the set of resources includes a subset of resources overlapping with a discontinuous reception (DRX) mode on duration of the second UE. The first UE may communicate with the second UE using one or more resources of the set of resources. Numerous other aspects are described.

20 Claims, 10 Drawing Sheets

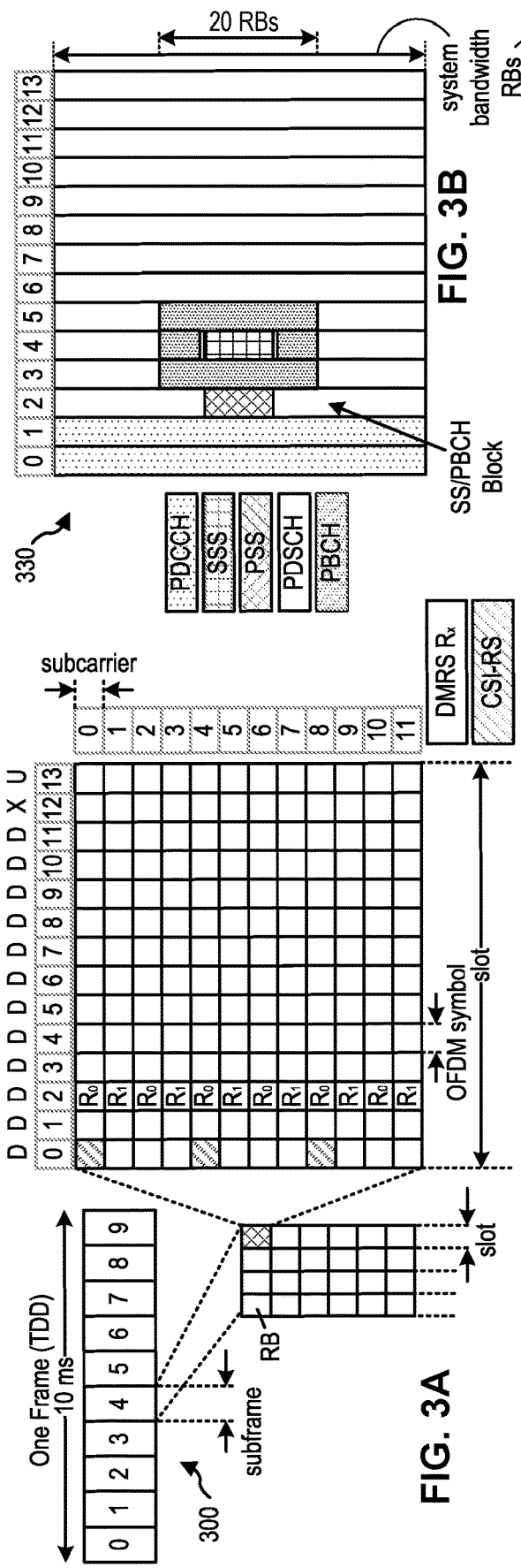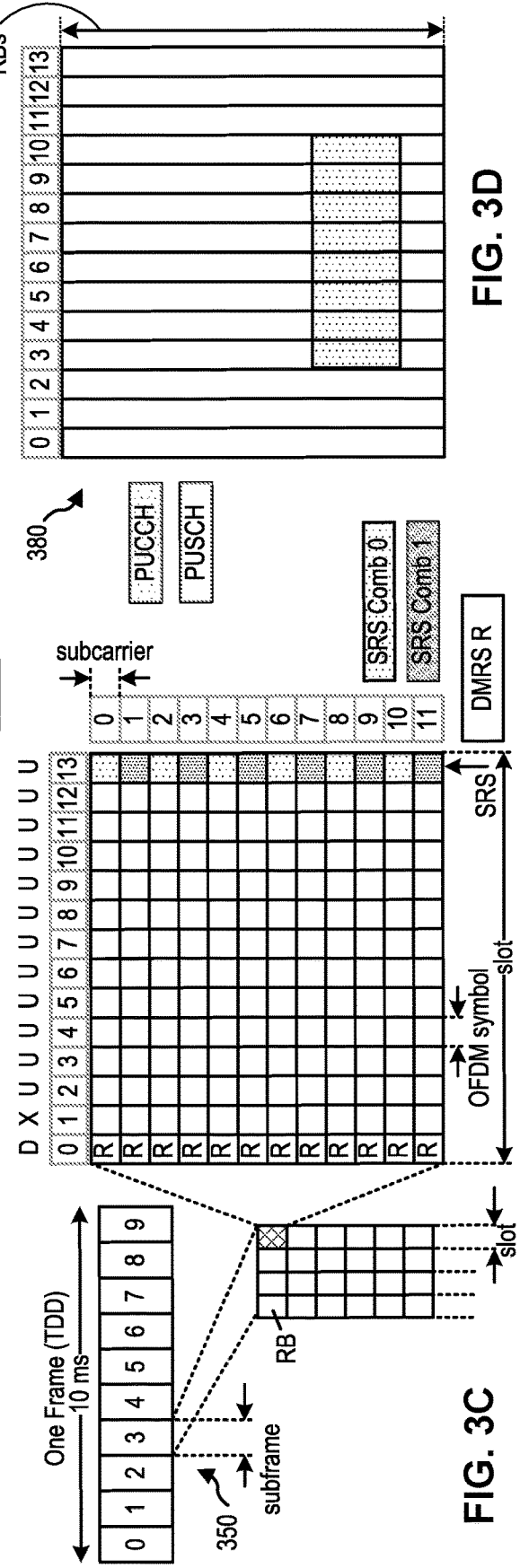

SIDELINK COMMUNICATIONS FOR DIFFERENTLY-CONFIGURED USER EQUIPMENT

CROSS-REFERENCE TO RELATED APPLICATION

This patent application claims priority to U.S. Provisional Patent Application No. 63/123,870, filed on Dec. 10, 2020, entitled "SIDELINK COMMUNICATIONS FOR DIFFERENTLY-CONFIGURED USER EQUIPMENT," and assigned to the assignee hereof. The disclosure of the prior Application is considered part of and is incorporated by reference into this Patent Application.

INTRODUCTION

Aspects of the present disclosure relate to wireless communications, and more particularly, to techniques for sidelink communications for differently-configured user equipment (UEs).

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method of wireless communication performed by a first user equipment (UE) including identifying a set of resources for communication with a second UE, wherein the set of resources includes a subset of resources overlapping with a discontinuous reception (DRX) mode on duration of the second UE; and communicating with the second UE using one or more resources of the set of resources.

Other aspects provide an apparatus operable, configured, or otherwise adapted to perform the aforementioned method as well as those described elsewhere herein; a non-transitory, computer-readable media comprising instructions that, when executed by one or more processors of an apparatus, cause the apparatus to perform the aforementioned method as well as those described elsewhere herein; a computer program product embodied on a computer-readable storage medium comprising code for performing the aforementioned method as well as those described elsewhere herein; and an apparatus comprising means for performing the aforementioned method as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

DETAILED DESCRIPTION

Aspects of the present disclosure provide apparatuses, methods, processing systems, and computer-readable mediums for sidelink communications for differently-configured user equipment (UEs).

In some communications systems, differently-configured UEs may be deployed in the same area. For example, in vehicle-to-everything (V2X) communications systems, some UEs may be configured as 3rd Generation Partnership Project (3GPP) Release 16 (Rel-16) UEs and other UEs may be configured as 3GPP Release 17 (Rel-17) UEs. Additionally, or alternatively, some UEs may be configured in accordance with earlier 3GPP releases (e.g., earlier than Rel-16) and/or configured in accordance with later 3GPP releases (e.g., later than Rel-17). Different features may be periodically introduced in different releases. For example, sidelink discontinuous reception (DRX) is introduced in Rel-17. Accordingly, Rel-16 UEs may not be configured for compatibility with sidelink DRX as sidelink DRX was not included in Rel-16.

When communicating on a sidelink, a Rel-16 UE may select resources according to a resource selection procedure. In some cases, the Rel-16 UE may select resources on which a Rel-17 UE is to monitor in accordance with a sidelink DRX mode. In such a case, the Rel-16 UE may successfully communicate with a Rel-17 UE that is using sidelink DRX.

However, if the Rel-16 UE selects a resource on which the Rel-17 UE is not to monitor in accordance with the sidelink DRX mode, the Rel-16 UE may fail to communicate with the Rel-17 UE. Accordingly, communications between differently configured UEs, such as Rel-16 UEs and Rel-17 UEs, may be unreliable and subject to failure.

Some aspects described herein enable configuration of a dedicated resource pool for a first UE to enable communication with a second UE. For example, a Rel-16 UE may be configured with a resource pool that is aligned to a sidelink DRX on duration (even though the Rel-16 UE is not configured with a sidelink DRX capability). Similarly, a Rel-17 UE may be configured such that a resource pool of the Rel-17 UE overlaps with the dedicated resource pool of the Rel-16 UE. In this case, when the Rel-16 UE attempts to communicate with the Rel-17 UE using the dedicated resource pool, the Rel-16 UE will be using resources that are aligned to the sidelink DRX on duration of the Rel-17 UE, thereby enabling communication. In this way, aspects described herein improve a reliability of communications and reduce a likelihood of failure of communications between different-configured UEs.

Introduction to Wireless Communication Networks

Figure 1:
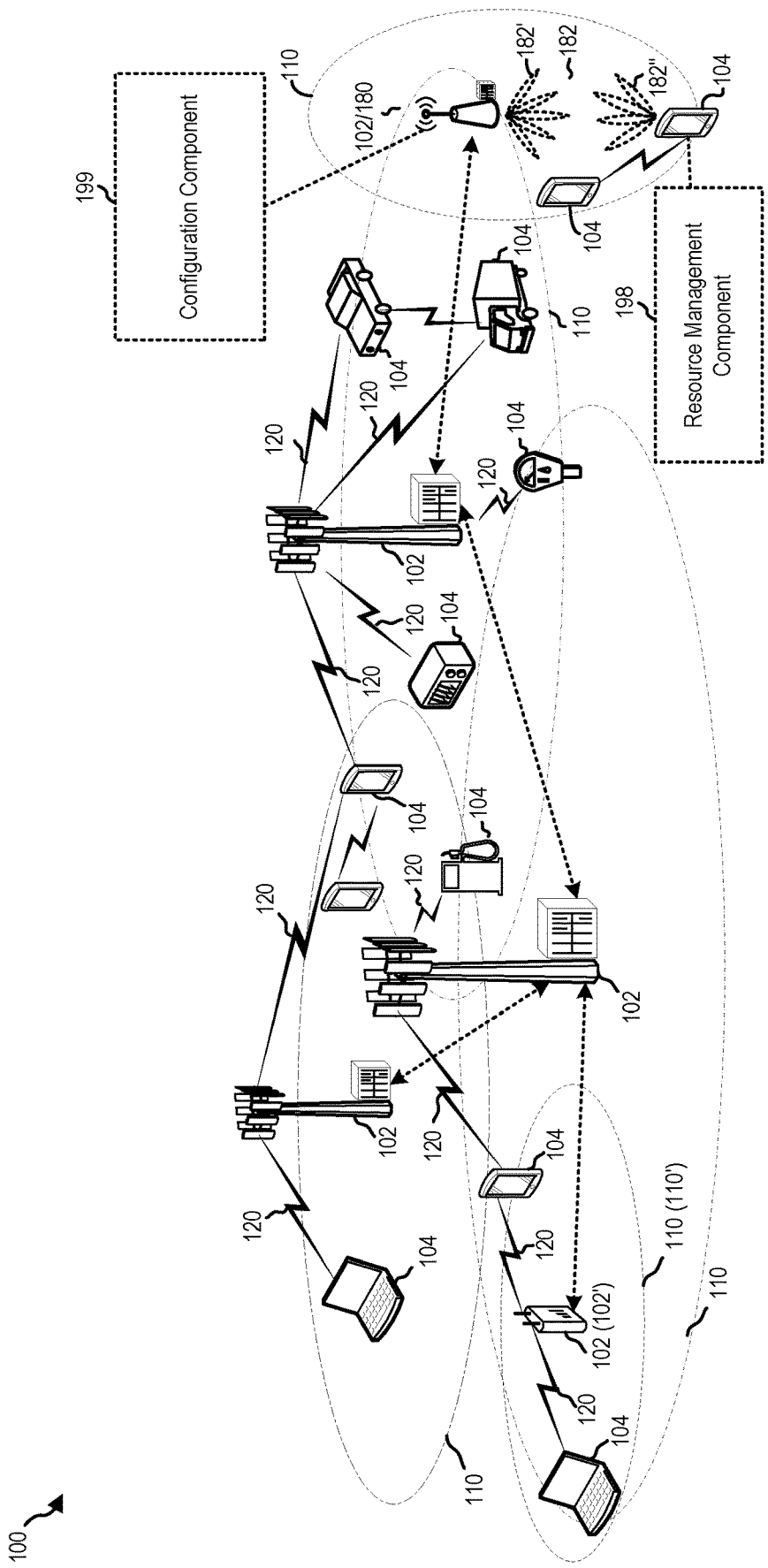
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102, user equipment (UEs) 104, and one or more core networks, such as an Evolved Packet Core (EPC) and a 5G Core (5GC) network, which interoperate to provide wireless communications services.

Base stations 102 may provide an access point to the EPC and/or 5GC for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a "gNB," "NodeB," "eNB," "ng-eNB" (e.g., an eNB that has been enhanced to provide connection to both EPC and 5GC), an "access point," a "base transceiver station," a "radio base station," a "radio transceiver," a "transceiver function," or a "transmission reception point" ("TRP") in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as "reverse link") transmissions from a user equipment 104 to a base station 102 and/or downlink (DL) (also referred to as "forward link") transmissions from a base station 102 to a user equipment 104. The communication links 120 may use multiple-input and multiple-output (MIMO) antenna technology, including spatial multiplexing, beamforming, and/or transmit diversity in various aspects.

Examples of a UE 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. UEs 104 may be Internet of Things (IoT) devices (e.g., parking meters, gas pumps, toasters, vehicles, heart monitors, or other IoT devices), always on (AON) devices, or edge processing devices. A UE 104 may also be referred to more generally as a "station," a "mobile station," a "subscriber station," a "mobile unit," a "subscriber unit," a "wireless unit," a "remote unit," a "mobile device," a "wireless device", a "wireless communications device," a "remote device," a "mobile subscriber station," an "access terminal," a "mobile terminal," a "wireless terminal," a "remote terminal," a "handset," a "user agent," a "mobile client," or a "client."

Communications using higher frequency bands may have higher path loss and a shorter range compared to lower frequency communications. Accordingly, certain base stations (e.g., base station 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication system 100 includes configuration component 199, which may be configured to configure UE 104 for communication (e.g., on a sidelink with another UE 104).

Wireless communication system 100 further includes resource management component 198, which may be configured to identify a resource pool for communication with another UE 104, wherein the resource pool includes a subset of resources overlapping with a discontinuous reception (DRX) mode on duration of the other UE 104, and communicate with the other UE 104 using one or more resources of the resource pool.

Figure 2:
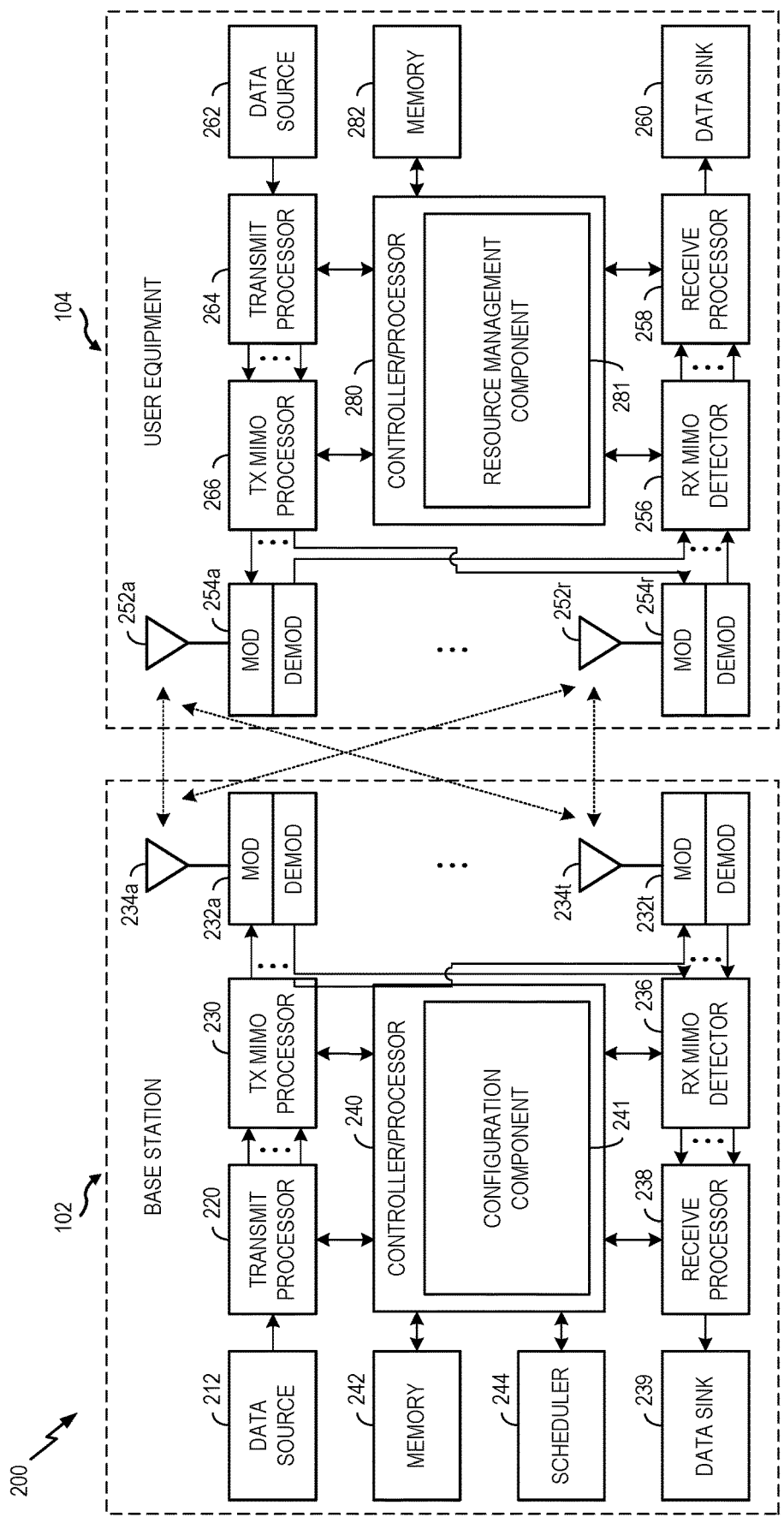
FIG. 2 is a block diagram conceptually illustrating aspects of an example of a base station and a user equipment (UE).

FIG. 2 depicts aspects of an example base station (BS) 102 and a user equipment (UE) 104.

Generally, base station 102 includes various processors (e.g., 220, 230, 236, 238, and 240), a memory 242, a scheduler 244, antennas 234a4 (collectively 234), transceivers 232a4 (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes configuration component 241, which may be representative of configuration component 199 of FIG. 1. Notably, while depicted as an aspect of controller/processor 240, configuration component 241 may be implemented additionally or alternatively in various other aspects of base station 102 in other implementations.

Generally, user equipment 104 includes various processors (e.g., 256, 258, 264, 266, and 280), a memory 282, antennas 252a-r (collectively 252), transceivers 254a-r (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes resource management component 281, which may be representative of resource management component 198 of FIG. 1. Notably, while depicted as an aspect of controller/processor 280, resource management component 281 may be implemented additionally or alternatively in various other aspects of user equipment 104 in other implementations.

FIGS. 3A-3D depict aspects of data structures for a wireless communication network, such as wireless communication system 100 of FIG. 1. In particular, FIG. 3A is a diagram 300 illustrating an example of a first subframe within a 5G (e.g., 5G New Radio (NR)) frame structure, FIG. 3B is a diagram 330 illustrating an example of downlink (DL) channels within a 5G subframe, FIG. 3C is a diagram 350 illustrating an example of a second subframe within a 5G frame structure, and FIG. 3D is a diagram 380 illustrating an example of uplink (UL) channels within a 5G subframe.

Further descriptions regarding FIG. 1, FIG. 2, and FIGS. 3A-3D are provided elsewhere in this disclosure.

Figure 4:
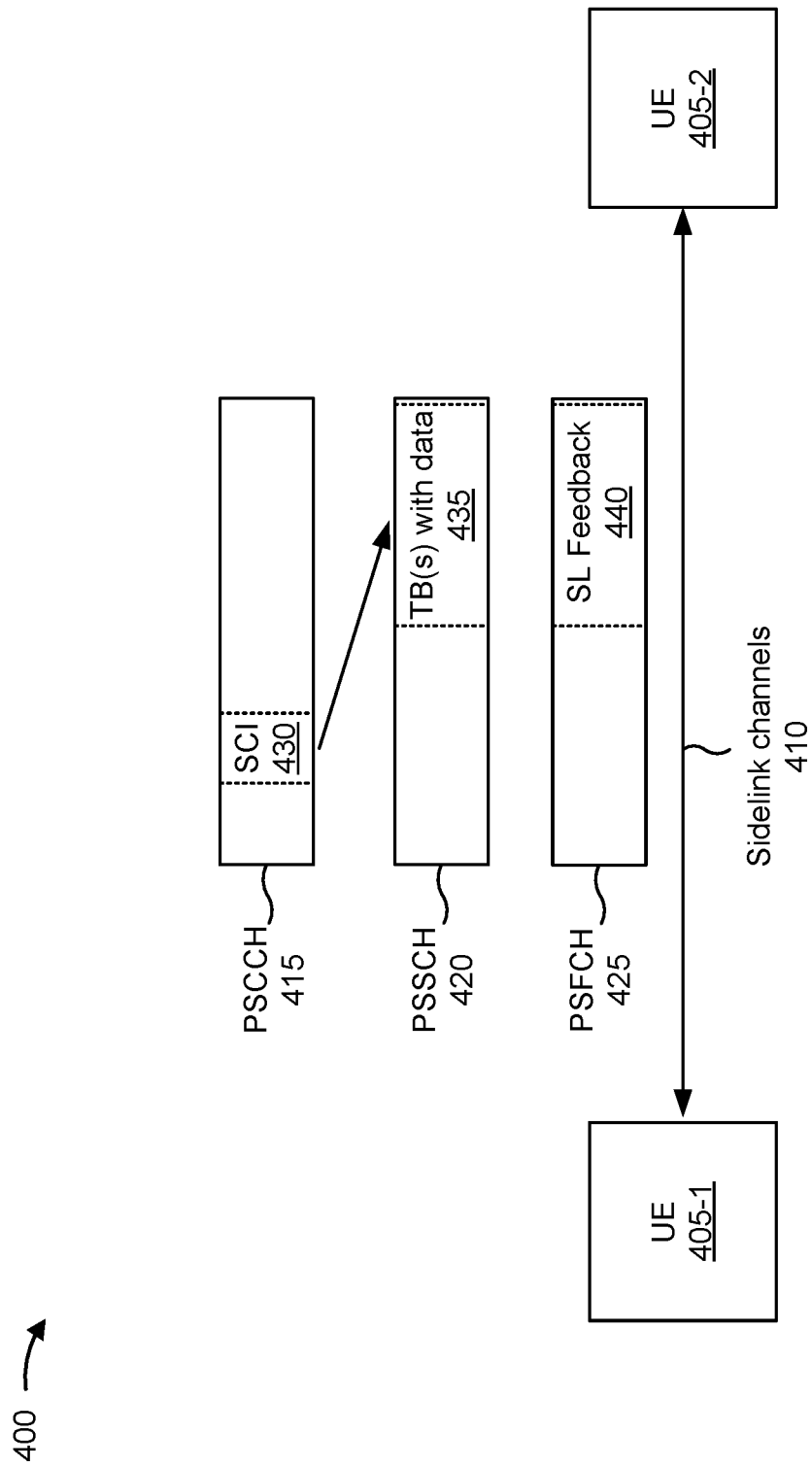
FIG. 4 is a diagram illustrating an example of sidelink communications, in accordance with the present disclosure.

FIG. 4 is a diagram illustrating an example 400 of sidelink communications, in accordance with the present disclosure.

As shown in FIG. 4, a first UE 405-1 may communicate with a second UE 405-2 (and one or more other UEs 405) via one or more sidelink channels 410. The UEs 405-1 and 405-2 may communicate using the one or more sidelink channels 410 for peer-to-peer (P2P) communications, device-to-device (D2D) communications, vehicle-to-everything (V2X) communications (e.g., which may include vehicle-to-vehicle (V2V) communications, vehicle-to-infrastructure (V21) communications, vehicle-to-pedestrian (V2P) communications, and/or the like), mesh networking, and/or the like. In some aspects, the UEs 405 (e.g., UE 405-1 and/or UE 405-2) may correspond to one or more other UEs described elsewhere herein, such as UE 104. In some aspects, the one or more sidelink channels 410 may use a PC5 interface and/or may operate in a high frequency band (e.g., the 5.9 GHz band). Additionally, or alternatively, the UEs 405 may synchronize timing of transmission time intervals (TTIs) (e.g., frames, subframes, slots, symbols, and/or the like) using global navigation satellite system (GNSS) timing.

As further shown in FIG. 4, the one or more sidelink channels 410 may include a physical sidelink control channel (PSCCH) 415, a physical sidelink shared channel (PSSCH) 420, and/or a physical sidelink feedback channel (PSFCH) 425. The PSCCH 415 may be used to communicate control information, similar to a physical downlink control channel (PDCCH) and/or a physical uplink control channel (PUCCH) used for cellular communications with a base station 102 via an access link or an access channel. The PSSCH 420 may be used to communicate data, similar to a physical downlink shared channel (PDSCH) and/or a physical uplink shared channel (PUSCH) used for cellular communications with a base station 102 via an access link or an access channel. For example, the PSCCH 415 may carry sidelink control information (SCI) 430, which may indicate various control information used for sidelink communications, such as one or more resources (e.g., time resources, frequency resources, spatial resources, and/or the like) where a transport block (TB) 435 may be carried on the PSSCH 420. The TB 435 may include data. The PSFCH 425 may be used to communicate sidelink feedback 440, such as hybrid automatic repeat request (HARQ) feedback (e.g., acknowledgement or negative acknowledgement (ACK/NACK) information), transmit power control (TPC), a scheduling request (SR), and/or the like.

In some aspects, the one or more sidelink channels 410 may use resource pools. For example, a scheduling assignment (e.g., included in SCI 430) may be transmitted in sub-channels using specific resource blocks (RBs) across time. In some aspects, data transmissions (e.g., on the PSSCH 420) associated with a scheduling assignment may occupy adjacent resource blocks (RBs) in the same subframe as the scheduling assignment (e.g., using frequency division multiplexing) In some aspects, a scheduling assignment and associated data transmissions are not transmitted on adjacent RBs.

In some aspects, a UE 405 may operate using a transmission mode where resource selection and/or scheduling is performed by the UE 405 (e.g., rather than a base station 102). In some aspects, the UE 405 may perform resource selection and/or scheduling by sensing channel availability for transmissions. For example, the UE 405 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 405 may perform resource selection and/or scheduling using SCI 430 received in the PSCCH 415, which may indicate occupied resources, channel parameters, and/or the like. Additionally, or alternatively, the UE 405 may perform resource selection and/or scheduling by determining a channel busy rate (CBR) associated with various sidelink channels, which may be used for rate control (e.g., by indicating a maximum number of resource blocks that the UE 405 can use for a particular set of subframes).

In the transmission mode where resource selection and/or scheduling is performed by a UE 405, the UE 405 may generate sidelink grants, and may transmit the grants in SCI 430. A sidelink grant may indicate, for example, one or more parameters (e.g., transmission parameters) to be used for an upcoming sidelink transmission, such as one or more resource blocks to be used for the upcoming sidelink transmission on the PSSCH 420 (e.g., for TBs 435), one or more subframes to be used for the upcoming sidelink transmission, a modulation and coding scheme (MCS) to be used for the upcoming sidelink transmission, and/or the like. In some aspects, a UE 405 may generate a sidelink grant that indicates one or more parameters for semi-persistent scheduling (SPS), such as a periodicity of a sidelink transmission. Additionally, or alternatively, the UE 405 may generate a sidelink grant for event-driven scheduling, such as for an on-demand sidelink message.

As indicated above, FIG. 4 is provided as an example. Other examples may differ from what is described with respect to FIG. 4.

Figure 5:
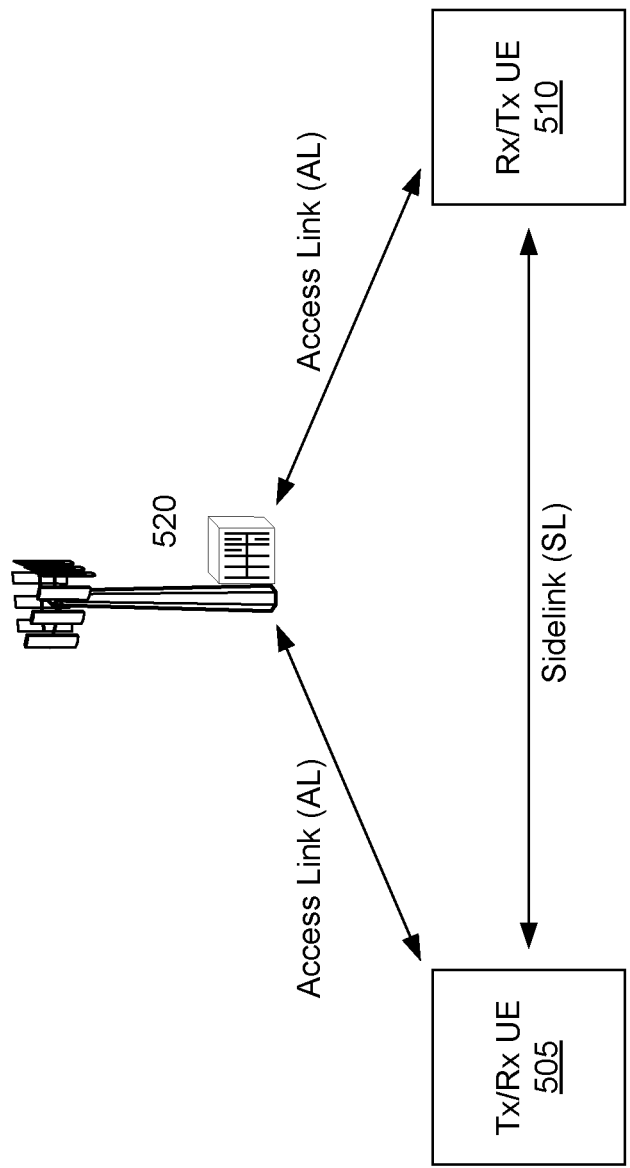
FIG. 5 is a diagram illustrating an example of sidelink communications and access link communications, in accordance with the present disclosure.

FIG. 5 is a diagram illustrating an example 500 of sidelink communications and access link communications, in accordance with the present disclosure.

As shown in FIG. 5, a transmitter (Tx)/receiver (Rx) UE 505 and an Rx/Tx UE 510 may communicate with one another via a sidelink, as described above in connection with FIG. 4. As further shown, in some sidelink modes, a base station 520 may communicate with the Tx/Rx UE 505 via a first access link. Additionally, or alternatively, in some sidelink modes, the base station 520 may communicate with the Rx/Tx UE 510 via a second access link. The Tx/Rx UE 505 and/or the Rx/Tx UE 510 may correspond to one or more UEs described elsewhere herein, such as the UE 104 of FIG. 1. The base station 520 may correspond to one or more base stations described elsewhere herein, such as the base station 102 of FIG. 1. Thus, a direct link between UEs 104 (e.g., via a PC5 interface) may be referred to as a "sidelink," and a direct link between a base station 102 and a UE 104 (e.g., via a Uu interface) may be referred to as an "access link." Sidelink communications may be transmitted via the sidelink, and access link communications may be transmitted via the access link. An access link communication may be either a downlink communication (from a base station 102 to a UE 104) or an uplink communication (from a UE 104 to a base station 102).

As indicated above, FIG. 5 is provided as an example. Other examples may differ from what is described with respect to FIG. 5.

Figure 6:
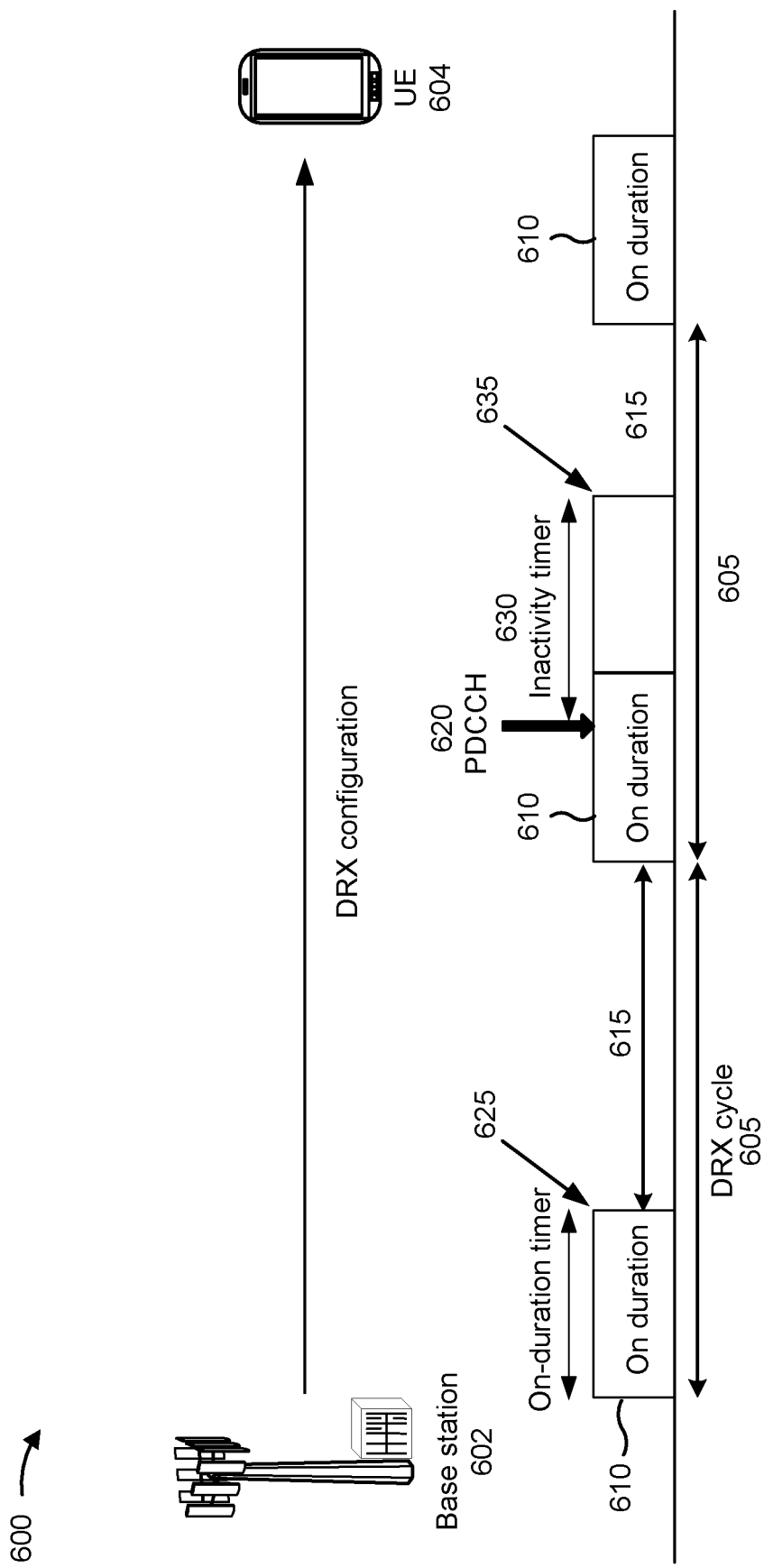
FIG. 6 is a diagram illustrating an example of discontinuous reception (DRX) configuration, in accordance with the present disclosure.

FIG. 6 is a diagram illustrating an example 600 of a DRX configuration, in accordance with the present disclosure.

As shown in FIG. 6, a base station 602 may transmit a DRX configuration to a UE 604 to configure a DRX cycle 605 for the UE 604. The base station 602 may correspond to the base station 102 and the UE 604 may correspond to the UE 104 of FIG. 1. A DRX cycle 605 may include a DRX on duration 610 (e.g., during which a UE 604 is awake or in an active state) and an opportunity to enter a DRX sleep state 615. As used herein, the time during which the UE 604 is configured to be in an active state during the DRX on duration 610 may be referred to as an "active time," and the time during which the UE 604 is configured to be in the DRX sleep state 615 may be referred to as an "inactive time." As described herein, the UE 604 may monitor a downlink control channel (e.g., a PDCCH) during the active time and may refrain from monitoring the PDCCH during the inactive time.

During the DRX on duration 610 (e.g., the active time), the UE 604 may monitor a downlink control channel (e.g., a PDCCH), as shown by reference number 620. For example, the UE 604 may monitor the PDCCH for downlink control information (DCI) pertaining to the UE 604. If the UE 604 does not detect and/or successfully decode any PDCCH communications intended for the UE 604 during the DRX on duration 610, then the UE 604 may enter the sleep state 615 (e.g., for the inactive time) at the end of the DRX on duration 610, as shown by reference number 625. In this way, the UE 604 may conserve battery power and reduce power consumption. As shown, the DRX cycle 605 may repeat with a configured periodicity according to the DRX configuration.

If the UE 604 detects and/or successfully decodes a PDCCH communication intended for the UE 604, then the UE 604 may remain in an active state (e.g., awake) for the duration of a DRX inactivity timer 630 (e.g., which may extend the active time). The UE 604 may start the DRX inactivity timer 630 at a time at which the PDCCH communication is received (e.g., in a transmission time interval (TTI) in which the PDCCH communication is received, such as a slot, a subframe, and/or the like). The UE 604 may remain in the active state until the DRX inactivity timer 630 expires, at which time the UE 604 may enter the sleep state 615 (e.g., for the inactive time), as shown by reference number 635. During the duration of the DRX inactivity timer 630, the UE 604 may continue to monitor for PDCCH communications, may obtain a downlink data communication (e.g., on a downlink data channel, such as a PDSCH) scheduled by the PDCCH communication, may prepare and/or transmit an uplink communication (e.g., on a PUSCH) scheduled by the PDCCH communication, and/or the like. The UE 604 may restart the DRX inactivity timer 630 after each detection of a PDCCH communication for the UE 604 for an initial transmission (e.g., but not for a retransmission). By operating in this manner, the UE 604 may conserve battery power and reduce power consumption by entering the sleep state 615.

As indicated above, FIG. 6 is provided as an example. Other examples may differ from what is described with respect to FIG. 6.

When differently-configured UEs are deployed in the same area, resource selections may become misaligned. For example, some UEs may be configured as 3GPP Release 16 (Rel-16) UEs and select first resources, and other UEs may be configured as 3GPP Release 17 (Rel-17) UEs and select second resources that do not overlap with the first resources. Additionally, or alternatively, some UEs may be configured in accordance with earlier 3GPP releases (e.g., earlier than Rel-16) and/or configured in accordance with later 3GPP releases (e.g., later than Rel-17) and select third or fourth resources that do not align with the first or second resources.

Resource selection may relate to features that are configured for a UE, and different features may be periodically introduced in different releases. For example, sidelink DRX is introduced in Rel-17. Accordingly, Rel-16 UEs may not be configured for compatibility with sidelink DRX as sidelink DRX was not included in Rel-16. In other words, Rel-16 UEs may select first resources without consideration for sidelink DRX. When communicating on a sidelink, a Rel-16 UE may select resources according to a Rel-16 resource selection procedure. In some cases, the Rel-16 UE may select resources on which a Rel-17 UE is to monitor in accordance with a sidelink DRX mode. In other words, the Rel-16 UE may select first resources that are aligned with second resources selected by a Rel-17 UE (e.g., which may select the second resources in accordance with the sidelink DRX mode). In such a case, the Rel-16 UE may successfully communicate with a Rel-17 UE that is using sidelink DRX.

However, if the Rel-16 UE selects a resource on which the Rel-17 UE is not to monitor in accordance with the sidelink DRX mode, the Rel-16 UE may fail to communicate with the Rel-17 UE. For example, the Rel-16 UE may select first resources that occur during a sleep state of the sidelink DRX mode of the Rel-17 UE (e.g., the Rel-17 UE may select second resources during the on duration of the sidelink DRX mode), which can result in the Rel-17 UE failing to receive transmissions from the Rel-16 UE. Accordingly, communications between differently configured UEs, such as Rel-16 UEs and Rel-17 UEs, may be unreliable and subject to failure.

Some aspects described herein enable configuration of a dedicated set of resources (a "resource pool") for a first UE to enable communication with a second UE. For example, a Rel-16 UE may be configured with a set of resources that is aligned to a sidelink DRX on duration (even though the Rel-16 UE is not configured with sidelink DRX capability). Similarly, a Rel-17 UE may be configured such that a set of resources of the Rel-17 UE overlaps with the dedicated set of resources of the Rel-16 UE. In this case, when the Rel-16 UE attempts to communicate with the Rel-17 UE using the dedicated set of resources, the Rel-16 UE will be using resources that are aligned to the sidelink DRX on duration of the Rel-17 UE, thereby enabling communication. In this way, aspects described herein improve a reliability of communications and reduce a likelihood of a communication failure between different-configured UEs.

Figure 7:
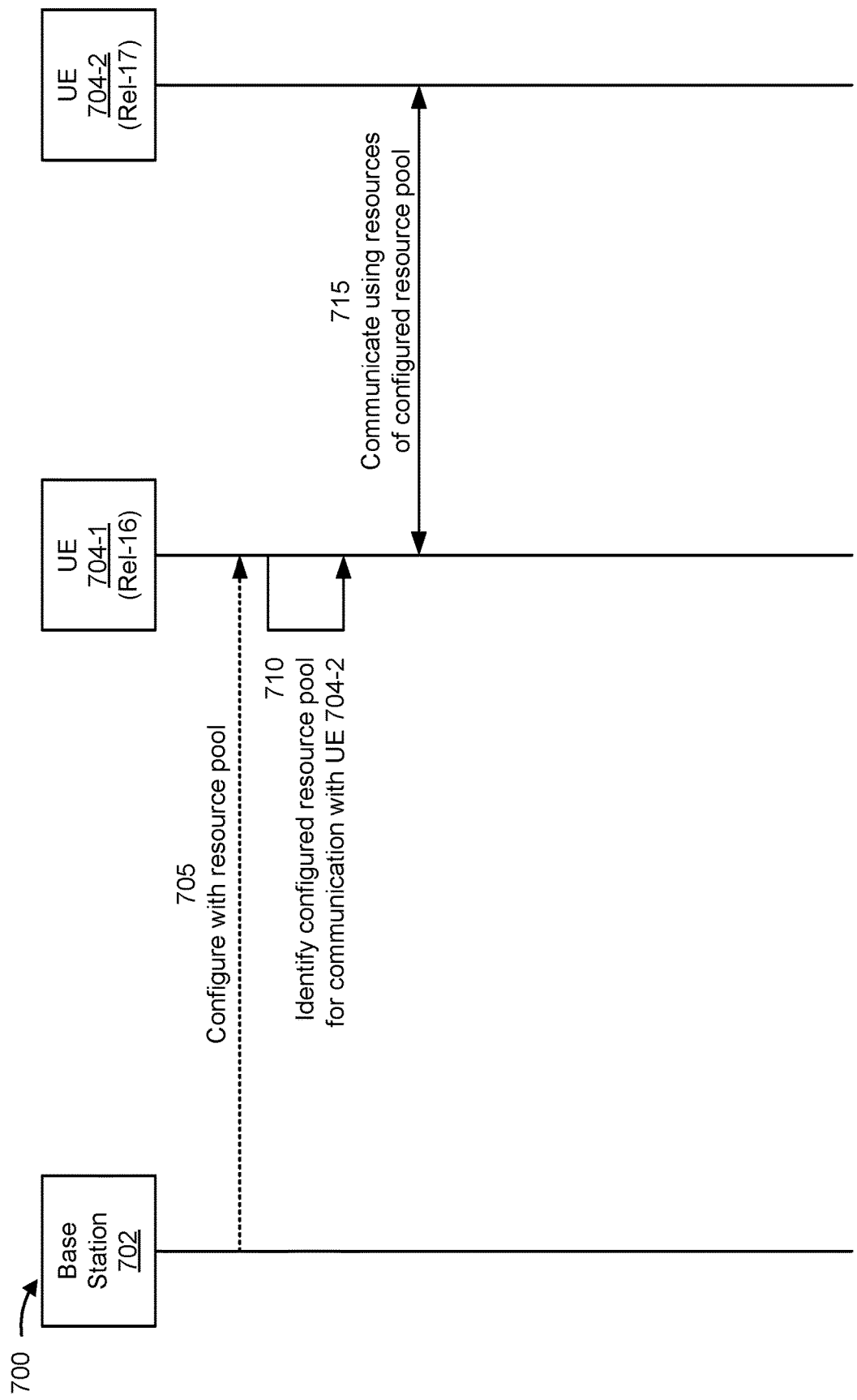
FIG. 7 is a diagram illustrating an example associated with sidelink communications for differently-configured UEs, in accordance with the present disclosure.

FIG. 7 is a diagram illustrating an example 700 associated with sidelink communications for differently-configured UEs, in accordance with the present disclosure. As shown in FIG. 7, example 700 includes communication between a base station 702, a first UE 704-1, and a second UE 704-2 (UEs 704), which may correspond to other base stations (e.g., base station 102) and UEs (e.g., UE 104), described herein. UE 704-1 may be a first type of UE, such as a Rel-16 UE configured without a sidelink DRX mode, and UE 704-2 may be a second type of UE, such as a Rel-17 UE configured with a sidelink DRX mode. In some aspects, base station 702 and UEs 704 may be included in a wireless network, such as wireless communication system 100. Base station 702 and UEs 704 may communicate via a wireless access link, which may include an uplink and a downlink, and UE 704-1 may communicate with UE 704-2 via a wireless sidelink, which may include a forward link and a reverse link.

As shown by reference numbers 705 and 710, UE 704-1 may identify a configured resource pool for communication with UE 704-2, such as based at least in part on receiving information from base station 702 configuring the resource pool. For example, base station 702 may configure a dedicated set of resources (e.g., a resource pool) for Rel-16 UEs, such as UE 704-1, to use for communications with Rel-17 UEs, such as UE 704-2, that are using a DRX mode. In this case, the dedicated set of resources may have an association between a service type (e.g., a V2X or V2P service type) and a resource pool (e.g., a provider service identifier (PSID) or application identifier (AID) of the resource pool). In this case, UE 704-1 may identify the association between the service type and the resource pool to identify the dedicated set of resources configured for communication with UE 704-2. In some aspects, UE 704-1 may identify the configured resource pool for UE 704-2 based at least in part on a profile. For example, based at least in part on a profile indicating that UE 704-2 is configured to use and/or is using a DRX mode, UE 704-1 may identify a resource pool that is aligned to the DRX mode.

In some aspects, the dedicated set of resources may be configured for at least a subset of another set of resources. For example, UE 704-1 may have a first resource pool for communication with other UEs that are not using a DRX mode and a second resource pool for communication with UEs that are using the DRX mode. In this case, the second resource pool may use the same sub-channels as the first resource pool and may use the same or a subset of slots that are covered by the first resource pool. The subset of slots may correspond to an on duration of a DRX mode, such as may be used by UE 704-2. In this case, UE 704-2 may be configured to use the second resource pool or a third resource pool that includes the second resource pool. In this way, when UE 704-2 monitors to receive communications (e.g., on the third resource pool or the second resource pool), UE 704-2 can receive communications from UE 704-1 (e.g., which is transmitting using the second resource pool).

In some aspects, UE 704-1 may identify configured resources that are aligned to a particular set of slots. For example, base station 702 may configure UE 704-1 with resources that are limited to a quantity of slots that align with a DRX on duration of UE 704-2. Additionally, or alternatively, UE 704-1 may identify configured resources with a configured gap between groups of contiguous sidelink slots. For example, base station 702 may configure UE 704-1 such that a gap between groups of contiguous sidelink slots in a resource pool (e.g., for communicating with UE 704-2) is greater than a maximum packet delay budget. In this way, UE 702-1 may align retransmissions with groups of contiguous sidelink slots and on durations of UE 704-2.

As shown by reference number 715, UE 704-1 may communicate with UE 704-2 using the configured resource pool. For example, UE 704-1 may transmit information to UE 704-2 using a resource pool aligned to a DRX on duration of UE 704-2. In this case, UE 704-2 may be constrained to have a DRX on duration that matches the configured resource pool, thereby enabling communication between UE 704-1 and UE 704-2 without interruption or dropped communications.

As indicated above, FIG. 7 is provided as an example. Other examples may differ from what is described with respect to FIG. 7.

Figure 8:
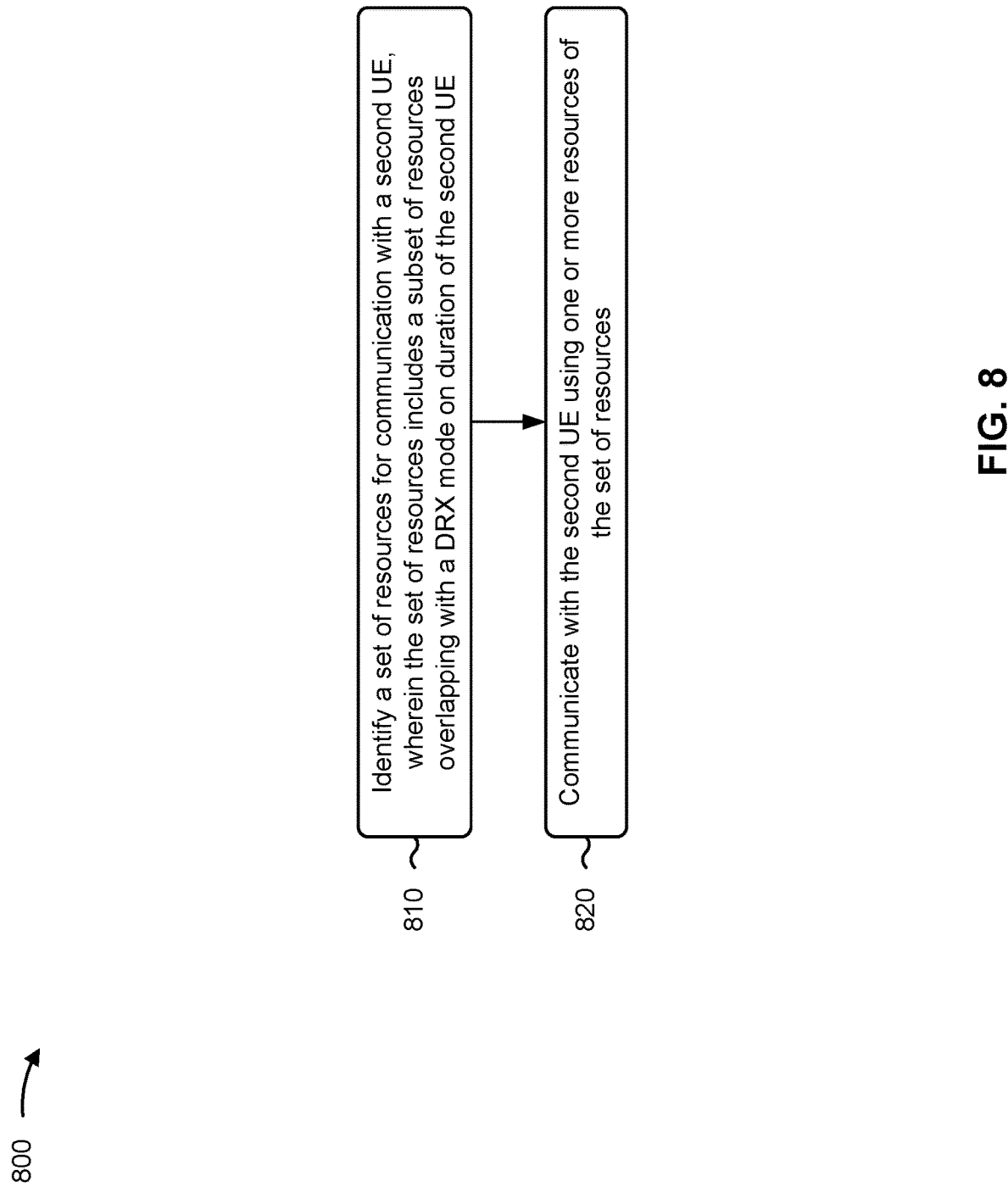
FIG. 8 is a diagram illustrating an example process associated with sidelink communications for differently-configured UEs, in accordance with the present disclosure.

FIG. 8 is a diagram illustrating an example process 800 performed, for example, by a first UE, in accordance with the present disclosure. Example process 800 is an example where the first UE (e.g., UE 104, among other UEs described herein) performs operations associated with sidelink communications for differently-configured UEs.

As shown in FIG. 8, in some aspects, process 800 may include identifying a set of resources for communication with a second UE, wherein the set of resources includes a subset of resources overlapping with a DRX mode on duration of the second UE (block 810). For example, the UE (e.g., using identification component 908, depicted in FIG. 9) may identify a set of resources for communication with a second UE, wherein the set of resources includes a subset of resources overlapping with a DRX mode on duration of the second UE, as described above.

As further shown in FIG. 8, in some aspects, process 800 may include communicating with the second UE using one or more resources of the set of resources (block 820). For example, the UE (e.g., using reception component 902 and/or transmission component 904, depicted in FIG. 9) may communicate with the second UE using one or more resources of the set of resources, as described above.

Process 800 may include additional aspects, such as any single aspect or any combination of aspects described below and/or in connection with one or more other processes described elsewhere herein.

In a first aspect, the set of resources is a first set of resources, assigned for communication with UEs using DRX mode, associated with one or more particular sub-channels, and the first UE is configured to use a second set of resources, assigned for communication with UEs not using DRX mode, associated with the one or more particular sub-channels.

In a second aspect, alone or in combination with the first aspect, the set of resources is a first set of resources, assigned for communication with UEs using DRX mode, associated with one or more particular sub-channels, and the second UE is configured to use a second set of resources associated with the one or more particular sub-channels.

In a third aspect, alone or in combination with one or more of the first and second aspects, the set of resources has an association with a particular set of applications or services.

In a fourth aspect, alone or in combination with one or more of the first through third aspects, the association is based at least in part on at least one of a V2X service type, a provider service identifier, or an application identifier.

In a fifth aspect, alone or in combination with one or more of the first through fourth aspects, the second UE is configured to use the set of resources.

In a sixth aspect, alone or in combination with one or more of the first through fourth aspects, the second UE is not configured to use the set of resources.

In a seventh aspect, alone or in combination with one or more of the first through sixth aspects, the set of resources comprises only slots of the DRX on duration.

In an eighth aspect, alone or in combination with one or more of the first through seventh aspects, a gap between a first group of contiguous sidelink slots in the set of resources and a second group of contiguous sidelink slots in the set of resources is greater than a maximum packet delay budget of a connection with the second UE.

In a ninth aspect, alone or in combination with one or more of the first through eighth aspects, the second UE is configured to have at least one DRX on duration aligned with the set of resources.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Example Wireless Communication Devices

Figure 9:
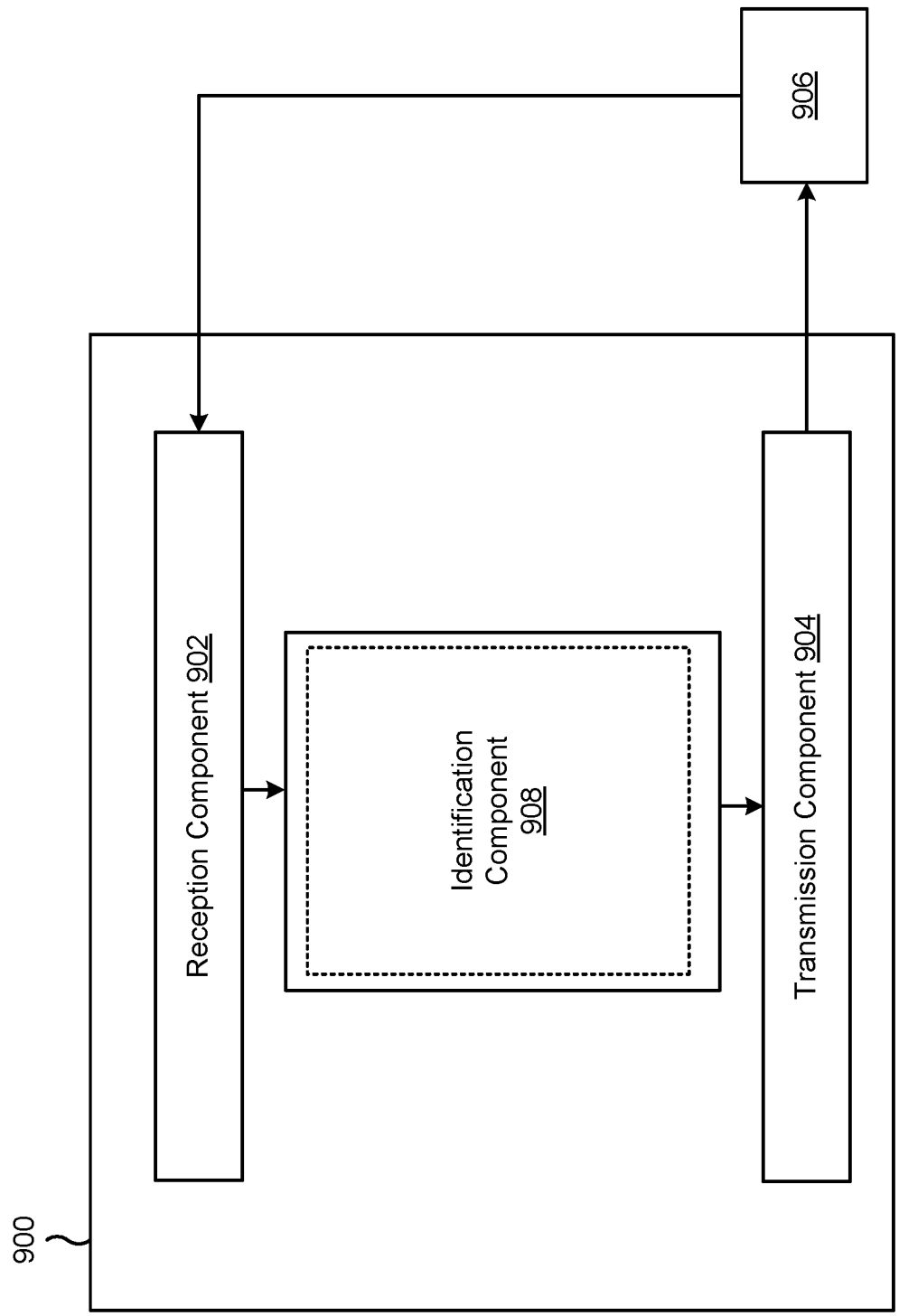
FIG. 9 is a block diagram of an example apparatus for wireless communication, in accordance with the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include an identification component 908, among other examples.

In some aspects, the apparatus 900 may be configured to perform one or more operations described herein. Additionally, or alternatively, the apparatus 900 may be configured to perform one or more processes described herein, such as process 800 of FIG. 8, among other examples. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The identification component 908 may identify a set of resources for communication with the apparatus 906, wherein the set of resources includes a subset of resources overlapping with a DRX mode on duration of the apparatus 906. The reception component 902 and/or the transmission component 904 may communicate with the apparatus 906 using one or more resources of the set of resources.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
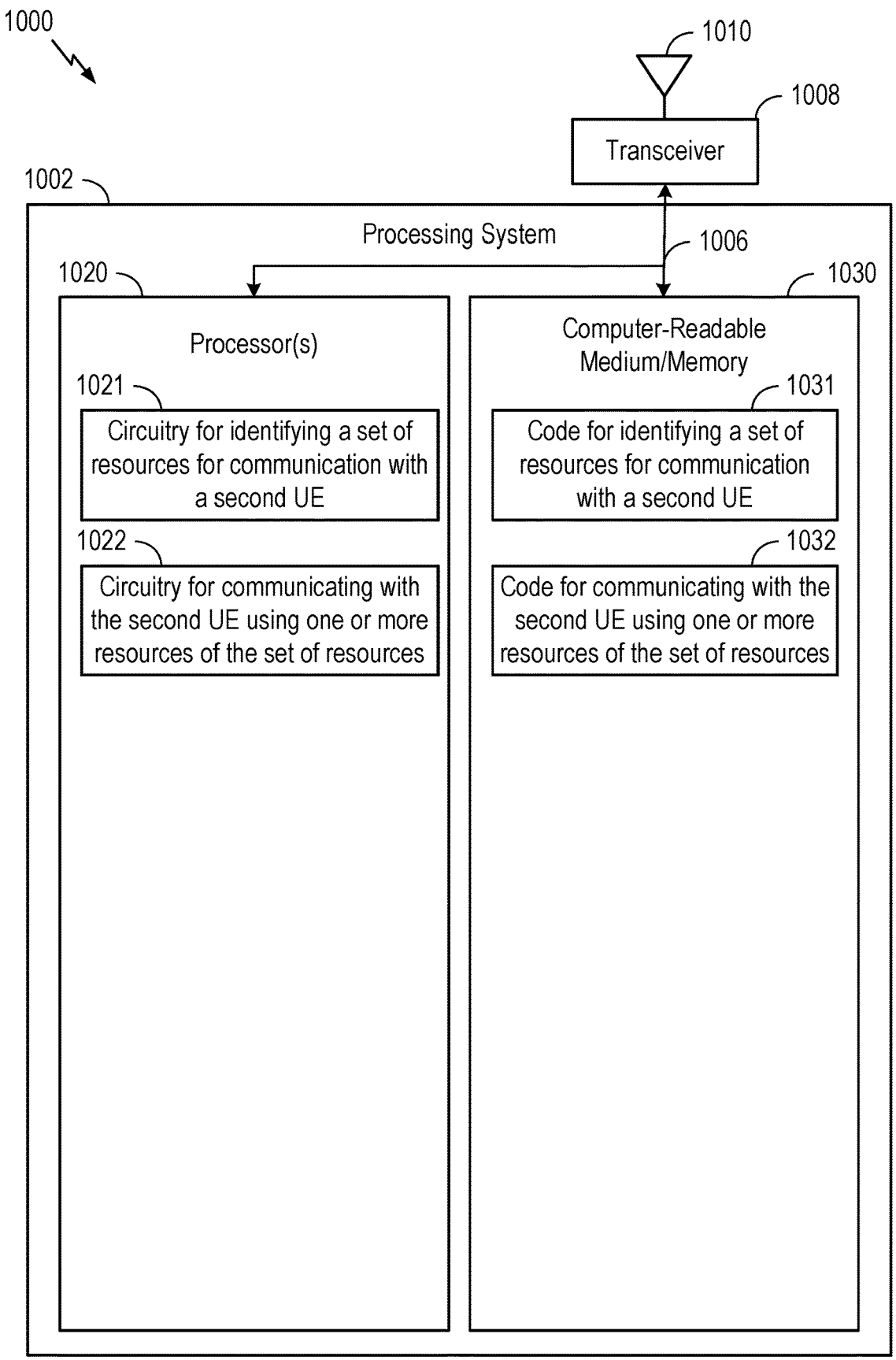
FIG. 10 is a block diagram of an example communications device, in accordance with the present disclosure.

FIG. 10 depicts an example communications device 1000 that includes various components operable, configured, or adapted to perform operations for the techniques disclosed herein, such as the operations depicted and described with respect to FIGS. 7-8. In some examples, communication device 1000 may be a base station 102 as described, for example with respect to FIGS. 1 and 2.

Communications device 1000 includes a processing system 1002 operatively coupled to a transceiver 1008 (e.g., a transmitter and/or a receiver). Transceiver 1008 is configured to transmit (or send) and receive signals for the communications device 1000 via an antenna 1010, such as the various signals as described herein. Processing system 1002 may be configured to perform processing functions for communications device 1000, including processing signals received and/or to be transmitted by communications device 1000.

Processing system 1002 includes one or more processors 1020 operatively coupled to a computer-readable medium/memory 1030 via a bus 1006. In certain aspects, computer-readable medium/memory 1030 is configured to store instructions (e.g., computer-executable code) that when executed by the one or more processors 1020, cause the one or more processors 1020 to perform the operations illustrated in FIGS. 7-8, or other operations for performing the various techniques described herein for sidelink communications for differently-configured UEs.

In the depicted example, computer-readable medium/memory 1030 stores code 1031 for identifying a set of resources for communication with a second UE and code 1032 for communicating with the second UE using one or more resources of the set of resources.

In the depicted example, the one or more processors 1020 include circuitry configured to implement the code stored in the computer-readable medium/memory 1030, including circuitry 1021 for identifying a set of resources for communication with a second UE and circuitry 1022 for communicating with the second UE using one or more resources of the set of resources.

Various components of communications device 1000 may provide means for performing the methods described herein, including with respect to FIGS. 7-8.

In some examples, means for identifying a set of resources for communication with a second UE and means for communicating with the second UE using one or more resources of the set of resources may include various processing system components, such as the one or more processors 1020 in FIG. 10, or aspects of the UE 104 depicted in FIG. 2, including receive processor 258, transmit processor 264, transmit (TX) MIMO processor 266, and/or controller/processor 280 (including resource management component 281).

Notably, FIG. 10 is an example, and many other examples and configurations of communication device 1000 are possible.

EXAMPLE ASPECTS

The following provides an overview of aspects of the present disclosure:

Aspect 1: A method of wireless communication performed by a first UE, comprising: identifying a set of resources for communication with a second UE, wherein the set of resources includes a subset of resources overlapping with a discontinuous reception (DRX) mode on duration of the second UE; and communicating with the second UE using one or more resources of the set of resources.

Aspect 2: The method of aspect 1, wherein the set of resources is a first set of resources assigned for communication with UEs using DRX mode and associated with one or more sub-channels, and wherein the first UE is configured to use a second set of resources assigned for communication with UEs not using DRX mode and associated with the one or more sub-channels.

Aspect 3: The method of any of aspects 1 to 2, wherein the set of resources is a first set of resources assigned for communication with UEs using DRX mode and associated with one or more sub-channels, and wherein the second UE is configured to use a second set of resources associated with the one or more sub-channels.

Aspect 4: The method of any of aspects 1 to 3, wherein the set of resources has an association with a set of applications or services.

Aspect 5: The method of any of aspects 1 to 4, wherein the association is based at least in part on at least one of: a vehicle-to-everything (V2X) service type, a provider service identifier, or an application identifier.

Aspect 6: The method of any of aspects 1 to 5, wherein the second UE is configured to use the set of resources.

Aspect 7: The method of any of aspects 1 to 5, wherein the second UE is not configured to use the set of resources.

Aspect 8: The method of any of aspects 1 to 7, wherein the set of resources comprises only slots of the DRX on duration.

Aspect 9: The method of any of aspects 1 to 8, wherein a gap between a first group of contiguous sidelink slots in the set of resources and a second group of contiguous sidelink slots in the set of resources is greater than a maximum packet delay budget of a connection with the second UE.

Aspect 10: The method of any of aspects 1 to 9, wherein the second UE is configured to have at least one DRX on duration aligned with the set of resources.

Aspect 11: An apparatus for wireless communication at a device, comprising a processor; memory operatively coupled with the processor; and instructions stored in the memory and executable by the processor to cause the apparatus to perform the method of one or more aspects of aspects 1-10.

Aspect 12: A device for wireless communication, comprising a memory and one or more processors operatively coupled to the memory, the memory and the one or more processors configured to perform the method of one or more aspects of aspects 1-10.

Aspect 13: An apparatus for wireless communication, comprising at least one means for performing the method of one or more aspects of aspects 1-10.

Aspect 14: A non-transitory computer-readable medium storing code for wireless communication, the code comprising instructions executable by a processor to perform the method of one or more aspects of aspects 1-10.

Aspect 15: A non-transitory computer-readable medium storing a set of instructions for wireless communication, the set of instructions comprising one or more instructions that, when executed by one or more processors of a device, cause the device to perform the method of one or more aspects of aspects 1-10.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as "software," "firmware," "middleware," "microcode," "hardware description language," or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of a list of" items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first user equipment (UE) configured for wireless communication, comprising:
   one or more memories comprising processor-readable instructions; and
   one or more processors configured to execute the processor-readable instructions and cause the first UE to:
      identify a set of resources for communication with a second UE, wherein the set of resources includes a subset of resources overlapping with a discontinuous reception (DRX) mode on duration of the second UE; and
      communicate with the second UE using one or more resources of the set of resources.

2. The first UE of claim 1, wherein the set of resources is a first set of resources assigned for communication with UEs using DRX mode and associated with one or more sub-channels, and
   wherein the first UE is configured to use a second set of resources assigned for communication with UEs not using DRX mode and associated with the one or more sub-channels.

3. The first UE of claim 1, wherein the set of resources is a first set of resources assigned for communication with UEs using DRX mode and associated with one or more sub-channels, and
   wherein the second UE is configured to use a second set of resources associated with the one or more sub-channels.

4. The first UE of claim 1, wherein the set of resources has an association with a set of applications or services.

5. The first UE of claim 4, wherein the association is based at least in part on at least one of: a vehicle-to-everything (V2X) service type, a provider service identifier, or an application identifier.

6. The first UE of claim 1, wherein the second UE is configured to use the set of resources.

7. The first UE of claim 1, wherein the second UE is not configured to use the set of resources.

8. The first UE of claim 1, wherein the set of resources comprises only slots of the DRX on duration.

9. The first UE of claim 1, wherein a gap between a first group of contiguous sidelink slots in the set of resources and a second group of contiguous sidelink slots in the set of resources is greater than a maximum packet delay budget of a connection with the second UE.

10. The first UE of claim 1, wherein the second UE is configured to have at least one DRX on duration aligned with the set of resources.

11. A method of wireless communication performed by a first user equipment (UE), comprising:
    identifying a set of resources for communication with a second UE, wherein the set of resources includes a subset of resources overlapping with a discontinuous reception (DRX) mode on duration of the second UE; and
    communicating with the second UE using one or more resources of the set of resources.

12. The method of claim 11, wherein the set of resources is a first set of resources assigned for communication with UEs using DRX mode and associated with one or more sub-channels, and
    wherein the first UE is configured to use a second set of resources assigned for communication with UEs not using DRX mode and associated with the one or more sub-channels.

13. The method of claim 11, wherein the set of resources is a first set of resources assigned for communication with UEs using DRX mode and associated with one or more sub-channels, and
    wherein the second UE is configured to use a second set of resources associated with the one or more sub-channels.

14. The method of claim 11, wherein the set of resources has an association with a set of applications or services.

15. The method of claim 14, wherein the association is based at least in part on at least one of: a vehicle-to-everything (V2X) service type, a provider service identifier, or an application identifier.

16. The method of claim 11, wherein the second UE is configured to use the set of resources.

17. The method of claim 11, wherein the second UE is not configured to use the set of resources.

18. The method of claim 11, wherein the set of resources comprises only slots of the DRX on duration.

19. The method of claim 11, wherein a gap between a first group of contiguous sidelink slots in the set of resources and a second group of contiguous sidelink slots in the set of resources is greater than a maximum packet delay budget of a connection with the second UE.

20. A non-transitory computer-readable medium storing a set of instructions for wireless communication, the set of instructions comprising:
   one or more instructions that, when executed by one or more processors of a first user equipment (UE), cause the first UE to:
      identify a set of resources for communication with a second UE, wherein the set of resources includes a subset of resources overlapping with a discontinuous reception (DRX) mode on duration of the second UE; and
      communicate with the second UE using one or more resources of the set of resources.

* * * * *